US012632689B2

(12) United States Patent
Yee et al.

(10) Patent No.: US 12,632,689 B2
(45) Date of Patent: May 19, 2026

(54) FINGER-ACTIVATED CHIP OR CONTACTLESS CARD

(71) Applicant: Capital One Services, LLC, McLean, VA (US)

(72) Inventors: Bryant Yee, Washington, DC (US); Tyler Maiman, Melville, NY (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 410 days.

(21) Appl. No.: 17/655,310

(22) Filed: Mar. 17, 2022

(65) Prior Publication Data
US 2023/0297805 A1 Sep. 21, 2023

(51) Int. Cl.
| | |
|---|---|
| *G06K 19/073* | (2006.01) |
| *G06K 7/00* | (2006.01) |
| *G06Q 20/34* | (2012.01) |
| *G06Q 20/40* | (2012.01) |

(52) U.S. Cl.
CPC ..... *G06K 19/07354* (2013.01); *G06K 7/0021* (2013.01); *G06Q 20/341* (2013.01); *G06Q 20/4014* (2013.01)

(58) Field of Classification Search
CPC ........... G06K 19/07354; G06K 7/0021; G06Q 20/341; G06Q 20/4014; G06Q 20/352; G07F 19/20; G07F 7/084; G07F 7/0866
See application file for complete search history.

(56) References Cited

U.S. PATENT DOCUMENTS

| | | | | |
|---|---|---|---|---|
| 4,490,587 A | * | 12/1984 | Miller | H01H 13/785 |
| | | | | 200/512 |
| 6,390,373 B1 | * | 5/2002 | Beyer | G06K 19/07703 |
| | | | | 235/487 |
| 6,863,220 B2 | * | 3/2005 | Selker | G06K 19/0716 |
| | | | | 257/679 |
| 8,480,002 B2 | * | 7/2013 | Poidomani | G06K 19/0702 |
| | | | | 235/492 |
| 10,970,611 B2 | * | 4/2021 | Khaled Asef | H01H 13/702 |
| 11,062,312 B2 | * | 7/2021 | Dunjic | G06Q 20/3672 |
| 11,449,860 B2 | * | 9/2022 | Gupta | G06K 19/07709 |
| 2008/0099556 A1 | * | 5/2008 | Park | G07F 7/0806 |
| | | | | 235/492 |
| 2010/0252633 A1 | * | 10/2010 | Barkan | G06K 7/1096 |
| | | | | 235/462.24 |

(Continued)

FOREIGN PATENT DOCUMENTS

JP 2019071105 A 5/2019

*Primary Examiner* — Steven S Paik
*Assistant Examiner* — Asifa Habib
(74) *Attorney, Agent, or Firm* — Harrity & Harrity, LLP

(57) ABSTRACT

In some implementations, an integrated circuit may receive, from the front-end device and at a communication device embedded in a substrate, an incoming signal indicating a request for information. Accordingly, the integrated circuit may verify that at least one correct contact, of a plurality of contacts on the substrate, has been connected to circuitry embedded in the substrate. Therefore, the integrated circuit may transmit, to the front-end device and using the communication device, an outgoing signal responding to the request for information based on verifying that the at least one correct contact has been connected.

9 Claims, 13 Drawing Sheets

100

(56)                    References Cited

U.S. PATENT DOCUMENTS

| | | | |
|---|---|---|---|
| 2014/0279555 A1* | 9/2014 | Guillaud | G06Q 20/341 |
| | | | 705/65 |
| 2015/0097038 A1* | 4/2015 | Narendra | G06K 19/0723 |
| | | | 235/492 |
| 2015/0301603 A1* | 10/2015 | Maggiali | G06F 3/016 |
| | | | 345/174 |
| 2017/0289127 A1* | 10/2017 | Hendrick | H04W 12/065 |
| 2017/0322591 A1* | 11/2017 | Lee | G06F 1/169 |
| 2018/0336550 A1* | 11/2018 | Hewitt | G06Q 20/405 |
| 2019/0019195 A1* | 1/2019 | Dunjic | G06Q 40/02 |
| 2019/0286805 A1* | 9/2019 | Law | G06F 21/34 |
| 2019/0340481 A1* | 11/2019 | Locke | G06Q 20/3278 |
| 2019/0377995 A1* | 12/2019 | Khaled Asef | G06K 19/07743 |
| 2019/0392427 A1* | 12/2019 | Wilson | G06Q 20/20 |
| 2022/0020030 A1* | 1/2022 | Dunjic | G06Q 20/40 |
| 2025/0129895 A1* | 4/2025 | Lobez | F17C 13/04 |

* cited by examiner

400

110

104

108

106

102

450

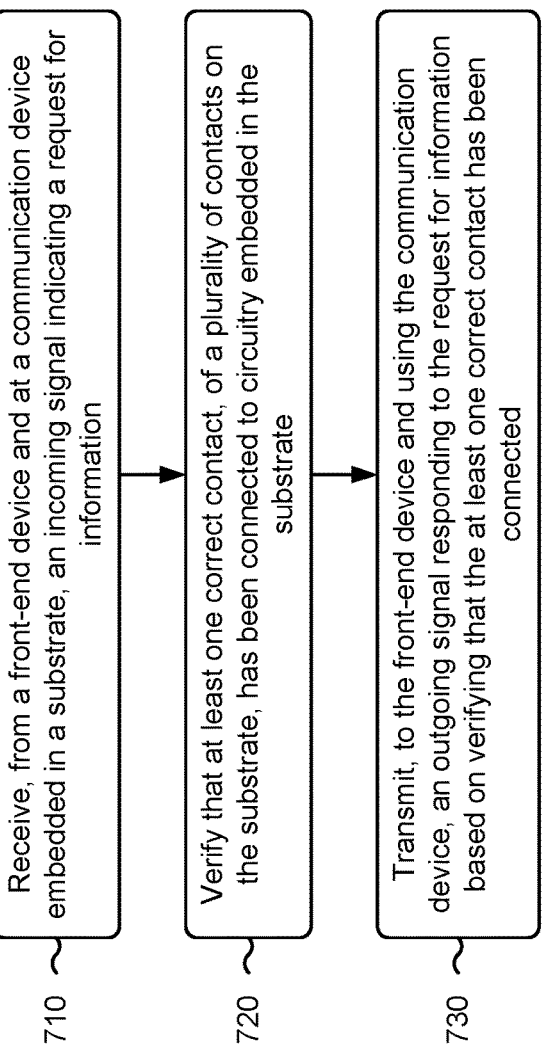

Receive, from a front-end device and at a communication device embedded in a substrate, an incoming signal indicating a request for information Verify that at least one correct contact, of a plurality of contacts on the substrate, has been connected to circuitry embedded in the substrate Transmit, to the front-end device and using the communication device, an outgoing signal responding to the request for information based on verifying that the at least one correct contact has been connected

FINGER-ACTIVATED CHIP OR CONTACTLESS CARD

BACKGROUND

Physical cards, such as access badges, radio frequency identification (RFID) cards, transaction cards, and other cards, often use chip technology (e.g., accessed via an electrical contact pad) and/or contactless technology (e.g., according to International Organization for Standardization (ISO) and International Electrotechnical Commission (IEC) standard 14443 (ISO/IEC 14443) and/or ISO/IEC 18000). Accordingly, an application-specific integrated circuit (ASIC) within the card responds to requests via the contact pad or via an antenna.

SUMMARY

Some implementations described herein relate to a card for communicating with a front-end device. The card may include a substrate and a communication device at least partially embedded in the substrate and configured to communicate with the front-end device. The card may further include circuitry configured to process an incoming signal from the communication device and to transmit an outgoing signal to the communication device and a plurality of contacts on the substrate, wherein at least one contact, of the plurality of contacts, is connected to the circuitry and is configured to activate the circuitry.

Some implementations described herein relate to a method of communicating with a front-end device. The method may include receiving, from the front-end device and at a communication device embedded in a substrate, an incoming signal indicating a request for information. The method may further include verifying that at least one correct contact, of a plurality of contacts on the substrate, has been connected to circuitry embedded in the substrate. The method may include transmitting, to the front-end device and using the communication device, an outgoing signal responding to the request for information based on verifying that the at least one correct contact has been connected.

Some implementations described herein relate to a circuit for communicating with a front-end device. The circuit may include an application-specific integrated circuit (ASIC). The ASIC may be configured to receive, from a communication device embedded in a substrate, an electrical signal based on a request for information from a front-end device. The ASIC may be further configured to measure a voltage or a current associated with at least one contact of a plurality of contacts on the substrate. The ASIC may be configured to transmit, to the communication device, an electrical signal in response to the request for information from the front-end device based on the voltage or the current satisfying a threshold.

BRIEF DESCRIPTION OF THE DRAWINGS

FIG. 7 is a flowchart of an example process relating to activating a card based on contact with a finger.

DETAILED DESCRIPTION

The following detailed description of example implementations refers to the accompanying drawings. The same reference numbers in different drawings may identify the same or similar elements.

Chip technology (e.g., consistent with according to International Organization for Standardization (ISO) and International Electrotechnical Commission (IEC) standard 7816 (ISO/IEC 7816)) and contactless technology (e.g., consistent with ISO/IEC 14443 or ISO/IEC 18000) is used by many physical cards. Accordingly, an application-specific integrated circuit (ASIC) within a physical card interacts with a front-end device (e.g., an access control panel, a point-of-sale (PoS) system, an automated teller machine (ATM), and/or similar device) via the contact pad and/or via an antenna.

Some implementations described herein provide for a physical card that communicates with a front-end device when a contact, embedded on a substrate of the physical card, is active. As a result, security is improved because the physical card cannot be used without activating the contact (e.g., using a finger or another digit), which may be hidden or otherwise visually inconspicuous. In some implementations, the physical card may include a plurality of contacts embedded on the substrate, such that the physical card communicates with the front-end device when a correct contact (or a correct sequence of contacts), out of the plurality of contacts, is activated. As a result, security is improved because the physical card cannot be used without activating the correct contact or correct sequence of contacts (e.g., using a finger or another digit).

Figure 1A:
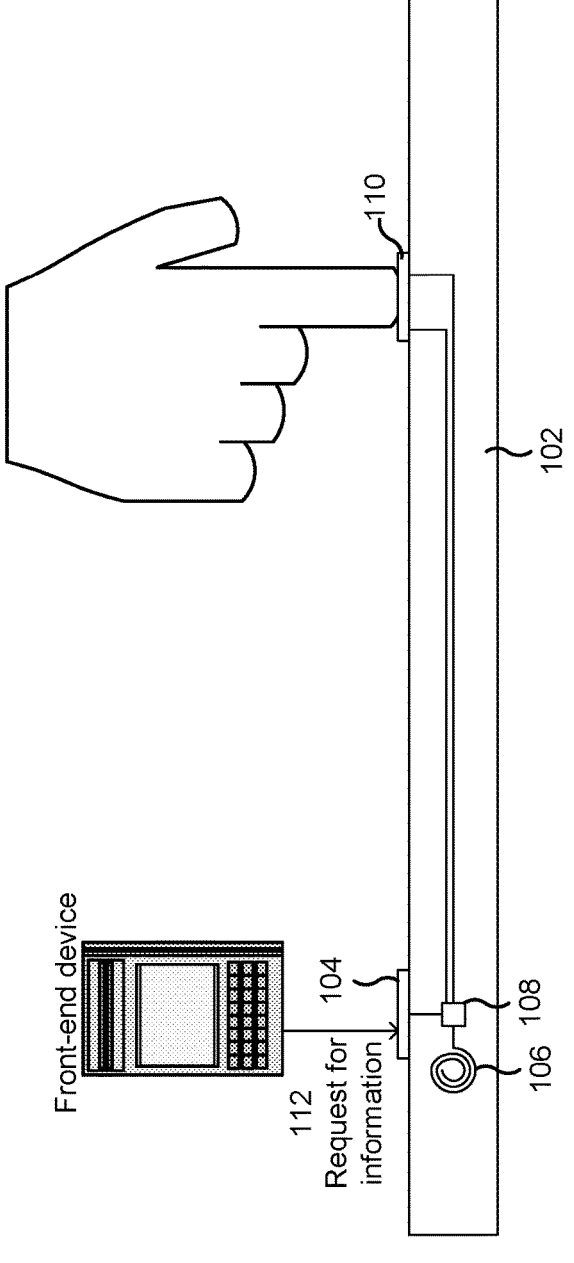
FIGS. 1A-1C are diagrams of an example implementation relating to a finger-activated chip card.
Figure 1B:
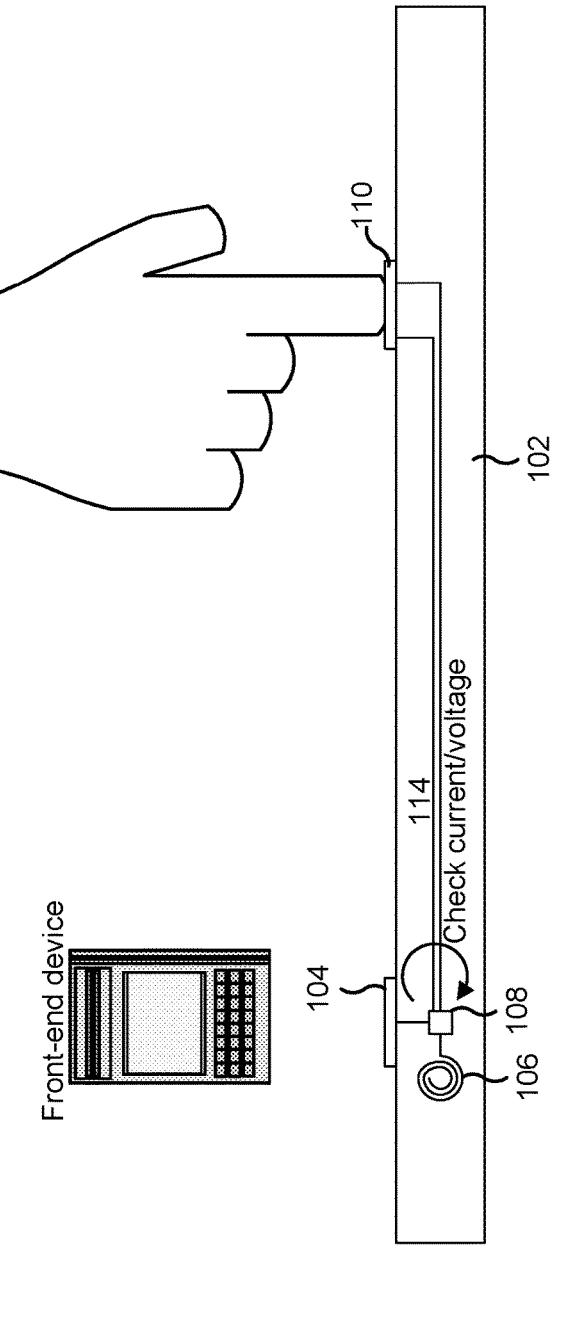
Figure 1C:
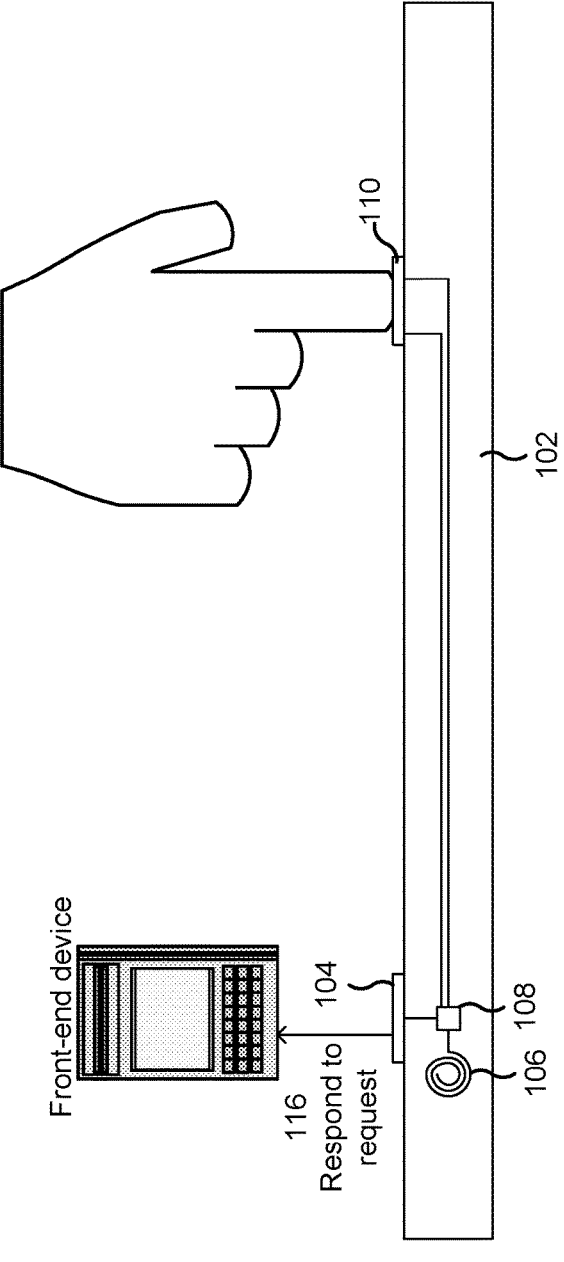

FIGS. 1A-1C are diagrams of an example 100 associated with a finger-activated chip card. As shown in FIGS. 1A-1C, example 100 includes a card and a front-end device. These devices are described in more detail in connection with FIGS. 5 and 6.

As shown in FIG. 1A, the card may include a substrate 102. The substrate 102 may include a metal (e.g., a single metal or an alloy), a plastic (e.g., a single plastic or a composite), and/or another type of solid material into which electrical components may be embedded. For example, the substrate may include a hollow cavity or other void into which electrical components are inserted. Accordingly, the substrate may include at least two portions of material that are adhered (e.g., using a glue or other adhesive), melded, or otherwise fused together to enclose the electrical components therein. Additionally, or alternatively, the substrate may be molded or otherwise formed around the electrical components in order to embed the electrical components therein. In some implementations, physical properties of the substrate 102 may be consistent with ISO/IEC 7810, ISO/IEC 14443-1, and/or ISO/IEC 7816-1.

The card may include a communication device. In some implementations, as further shown in FIG. 1A, the communication device may include contact pad 104. For example, the contact pad 104 may be a plurality of pins configured to physically and electrically contact the front-end device (e.g., according to ISO/IEC 7816-2). The contact pad 104 may therefore comprise a metal (e.g., a single metal or an alloy) and/or another type of conductive material.

Additionally, or alternatively, and as shown in FIG. 1A, the communication device may include an antenna 106. For example, the antenna 106 may be a passive transceiver configured to wireless communicate with the front-end device (e.g., according to ISO/IEC 14443-2 or ISO/IEC 18000). As an alternative, the antenna 106 may be an active transceiver, and the card may further include a battery or other power source such that the antenna 106 may communicate wirelessly with the front-end device.

As further shown in FIG. 1A, the card may include circuitry 108. The circuitry 108 may include an integrated circuit (IC), such as an ASIC, configured to process an incoming signal from the communication device (e.g., the contact pad 104 and/or the antenna 106) and to transmit an outgoing signal to the communication device. For example, as shown by reference number 112, the front-end device may transmit, and the communication device may receive, an incoming signal indicating a request for information. In some implementations, the contact pad 104 may receive an electrical signal, based on a request for information from the front-end device, such that the incoming signal is the electrical signal (or a filtered version of the electrical signal). Accordingly, the electrical signal may be a digital signal or an analog signal received using the contact pad 104 (e.g., a plurality of pins, as described above). In some implementations (e.g., consistent with ISO/IEC 7816-4), the electrical signal may include a plurality of signals based on a plurality of commands from the front-end device (e.g., such that the front-end device and the communication device exchange a plurality of command-response pairs).

As further shown in FIG. 1A, the card may include a contact 110 (e.g., at least one contact). The contact 110 may complete an electrical connection when a finger (or other digit) of the user applies pressure to the contact 110. Accordingly, as shown in FIG. 1B, the circuitry 108 may verify that the contact 110 has been connected to the circuitry 108. In some implementations, as shown by reference number 114, the circuitry 108 may measure a voltage and/or a current associated with the contact 110. Accordingly, the circuitry 108 may determine that a non-zero current and/or a non-open-circuit voltage differential is present across the contact 110.

In one example, the contact 110 may be positioned between the contact pad 104 and the circuitry 108 such that the circuitry 108 does not receive the incoming signal from the contact pad 104 unless the contact 110 is activated. As a result, no additional complexity is added to the circuitry 108. As an alternative, the contact 110 may be included parallel to a closed circuit including the contact pad 104 and the circuitry 108. Accordingly, the circuitry 108 may include a voltage detector and/or a current detector connected to the parallel circuit including the contact 110. As a result, the incoming signal is not distorted by electrical resistance or impedance added by the contact 110 (and, in some implementations, by the human digit).

In one example, as described in connection with FIG. 4A, the contact 110 may be two conductive portions configured to be connected by a human digit. For example, the contact 110 may include a recess within the substrate 102 (e.g., a gap in a top surface of the substrate 102) with one contact on one sidewall of the recess and another contact on an opposite sidewall of the recess. Accordingly, the contacts are electrically connected when the human digit is inserted into the recess. In another example, the contact 110 may be hidden within the substrate 102. For example, as described in connection with FIG. 4B, the contact 110 may be a pressure-activated switch that is hidden underneath a top surface of the substrate 102 and/or level with the top surface of the substrate 102 such that the contact 110 does not protrude or otherwise appear readily distinguishable, visually, from the top surface.

In some implementations, and as described in connection with FIGS. 3A-3B, the card may include a plurality of contacts on the substrate 102. Accordingly, the contact 110 may be a correct contact, of the plurality of contacts. Accordingly, the circuitry 108 may verify that the correct contact 110 is connected to the circuitry 108. For example, the circuitry 108 may determine that a non-zero current and/or a non-open-circuit voltage differential is present across the contact 110. Additionally, the plurality of contacts may include dummy contacts (e.g., one or more dummy contacts) that do not connect to the circuitry 108. As a result, security is increased because an unauthorized party does not know which contacts, of the plurality of contacts, are the dummy contacts. Alternatively, the plurality of contacts may include incorrect contacts (e.g., one or more incorrect contacts) that also connect to the circuitry 108. Accordingly, the circuitry 108 may verify that the incorrect contacts are not connected to the circuitry 108. For example, the circuitry 108 may determine that a zero current and/or an open-circuit voltage differential is present across the each of the incorrect contacts.

In some implementations, the correct contact 110 may be preconfigured. For example, the correct contact 110 may be hardwired as the only contact electrically connected to the circuitry 108 or the only contact that a voltage detector and/or a current detector of the circuitry 108 is configured to measure. Additionally, or alternatively, the circuitry 108 may be permanently programmed (e.g., via a read-only memory (ROM) or via circuit design) to measure only the correct contact 110. As an alternative, different contacts, of the plurality of contacts, may be selected as the correct contact. For example, the circuitry 108 may be reconfigurable (e.g., via a field programmable ROM or via field programmable integrated circuitry, such as a field-programmable gate array (FPGA)) to measure different contacts, of the plurality of contacts. In some implementations, the circuitry 108 may be reprogrammed via the contact pad 104 (e.g., at the front-end device or at another device electrically connected to the circuitry 108 via the contact pad 104). Selection of a new correct contact may be performed by a user (e.g., via a user device that transmits an indication of the new correct contact to a remote server that in turn communicates instructions to reprogram the circuitry 108 to the front-end device and/or another device). Alternatively, selection of a new correct contact may be performed by a remote server that communicates instructions to reprogram the circuitry 108 to the front-end device and/or another device (and, in some implementations, transmits an indication of the new correct contact to a user device).

In some implementations, two contacts (e.g., two or more contacts), of the plurality of contacts, are connected to the circuitry 108. Accordingly, the circuitry 108 may be configured to activate based on a combination of the two contacts being connected. For example, the two contacts may be positioned in series between the contact pad 104 and the circuitry 108 such that the circuitry 108 does not receive the incoming signal from the contact pad 104 unless the two contacts are activated. As a result, no additional complexity is added to the circuitry 108. As an alternative, the two contacts may be included parallel (e.g., in series on a single parallel circuit or on separate parallel circuits) to a closed circuit including the contact pad 104 and the circuitry 108. Accordingly, the circuitry 108 may include a voltage detector and/or a current detector connected to the parallel circuit (e.g., the single parallel circuit including the two contacts or the multiple parallel circuits including the two contacts). As a result, the incoming signal is not distorted by electrical resistance or impedance added by the two contacts (and, in some implementations, by the human digits activating the two contacts).

In some implementations, similarly as described above, the correct contact combination may be preconfigured. Alternatively, and similarly as described above, different contact combinations, of the plurality of contacts, may be selected as the correct contact combination.

In some implementations, the circuitry 108 may be configured to activate based on a sequence of two contacts (e.g., two or more contacts), of the plurality of contacts, being connected. For example, the circuitry 108 may include a voltage detector and/or a current detector configured to measure a voltage and/or a current, respectively, across different contacts according to a temporal pattern. Accordingly, when the correct sequence includes a first contact followed by a second contact, the circuitry 108 may measure the voltage and/or the current across the first contact during a first interval (e.g., one second, two seconds, and so on) to detect a non-open-circuit voltage and/or a non-zero current at least during a portion of the first interval followed by measuring the voltage and/or the current across the second contact during a second interval (e.g., one second, two seconds, and so on) to detect a non-open-circuit voltage and/or a non-zero current at least during a portion of the second interval. Similarly, the circuitry 108 may verify sequences longer than two contacts (e.g., including three contacts, four contacts, and so on).

In some implementations, a duration of each interval, for the sequence, may be preconfigured. For example, the circuitry 108 may be permanently programmed (e.g., via a ROM or via circuit design) to measure each contact in the sequence for a set duration. As an alternative, different durations may be selected. For example, the circuitry 108 may be reconfigurable (e.g., via a field programmable ROM or via field programmable integrated circuitry, such as an FPGA) to measure each contact in the sequence for a new duration (or for different durations). In some implementations, the circuitry 108 may be reprogrammed via the contact pad 104 (e.g., at the front-end device or at another device electrically connected to the circuitry 108 via the contact pad 104). Selection of a new duration (or durations) may be performed by a user (e.g., via a user device that transmits an indication of the new duration(s) to a remote server that in turn communicates instructions to reprogram the circuitry 108 to the front-end device and/or another device). Alternatively, selection of a new duration (or durations) may be performed by a remote server that communicates instructions to reprogram the circuitry 108 to the front-end device and/or another device (and, in some implementations, transmits an indication of the new duration(s) to a user device).

In some implementations, similarly as described above, the correct contact sequence may be preconfigured. Alternatively, and similarly as described above, different contact sequences may be selected as the correct contact sequence.

In any of the implementations described above, the circuitry 108 may verify that the contact 110 (e.g., the correct contact, the correct contact combination, or the correct contact sequence) has been activated based on the voltage and/or the current satisfying a threshold (e.g., a voltage threshold and/or a current threshold, respectively). For example, the threshold may be preconfigured based on conductive properties associated with a human digit (e.g., the current threshold may be in a range from approximately one microampere to approximately one nanoampere and/or the voltage threshold may be no more than five volts). Alternatively, the threshold may be preconfigured based on conductive properties associated with a switch (e.g., the current threshold may be in a range from approximately one ampere to approximately four amperes and/or the voltage threshold may be no more than five volts).

In some implementations, as described above, the threshold may be preconfigured. Alternatively, and similarly as described above, different thresholds may be selected as the current threshold and/or the voltage threshold.

Based on verifying that the contact 110 has been connected to the circuitry 108, the circuitry 108 may transmit, and the front-end device may receive, an outgoing signal responding to the request for information, as shown in FIG. 1C and by reference number 116. In some implementations, the contact pad 104 may transmit an electrical signal, based on response, to the request, from the circuitry 108, such that the outgoing signal is the electrical signal (or a filtered version of the electrical signal). Accordingly, the electrical signal may be a digital signal or an analog signal transmitted using the contact pad 104 (e.g., a plurality of pins, as described above). In some implementations (e.g., consistent with ISO/IEC 7816-4), the electrical signal may include a plurality of signals based on a plurality of responses from the circuitry 108 (e.g., such that the front-end device and the communication device exchange a plurality of command-response pairs).

By using techniques as described in connection with FIGS. 1A-1C, the card communicates with the front-end device when the contact 110, embedded on the substrate 102 of the physical card, is active. As a result, security is improved because the card cannot be used without activating the contact 110 (e.g., using a finger or another digit), which may be hidden or otherwise visually inconspicuous.

As indicated above, FIGS. 1A-1C are provided as an example. Other examples may differ from what is described with regard to FIGS. 1A-1C.

Figure 2A:
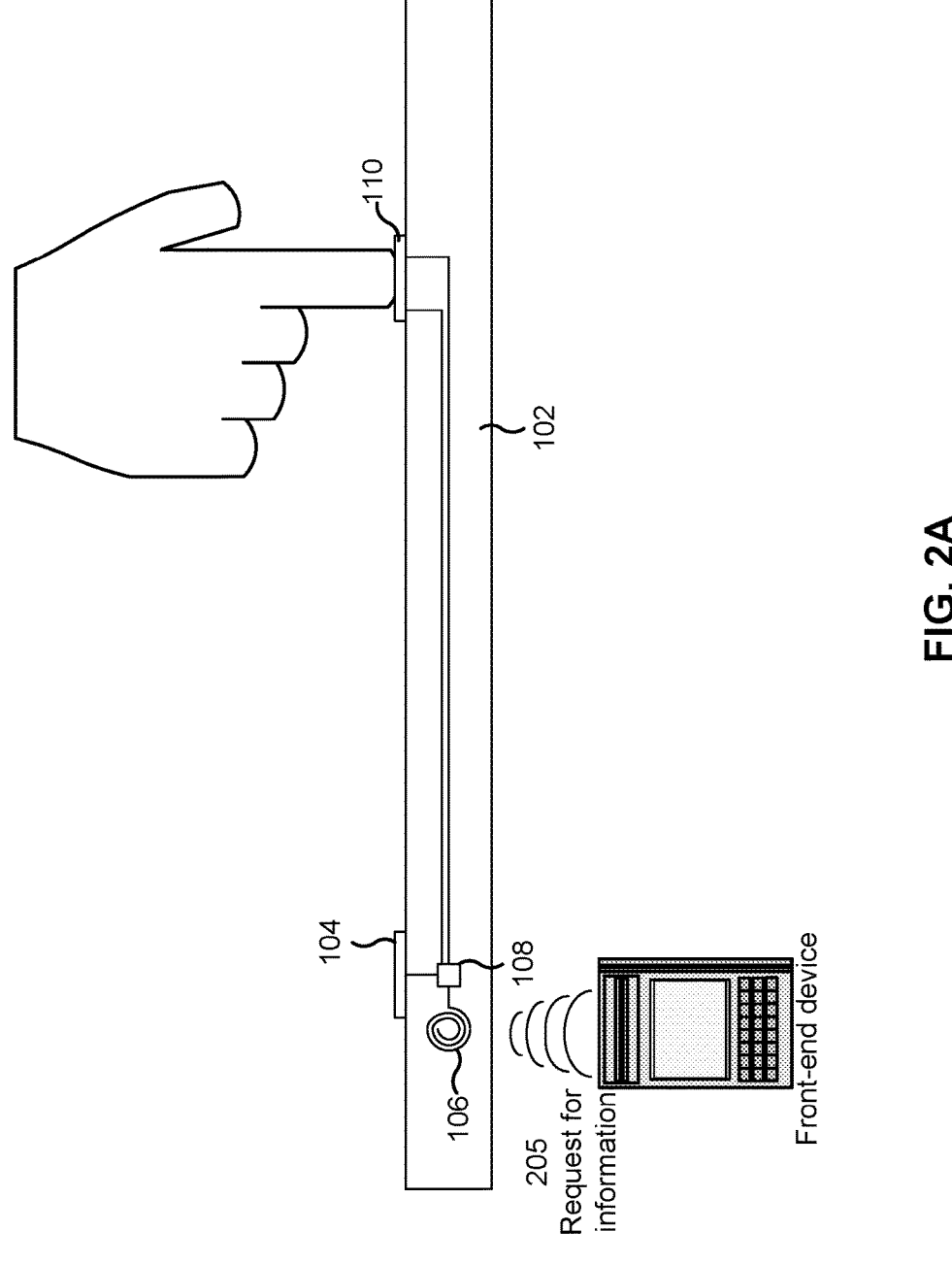
FIGS. 2A-2C are diagrams of an example implementation relating to a finger-activated contactless card.
Figure 2B:
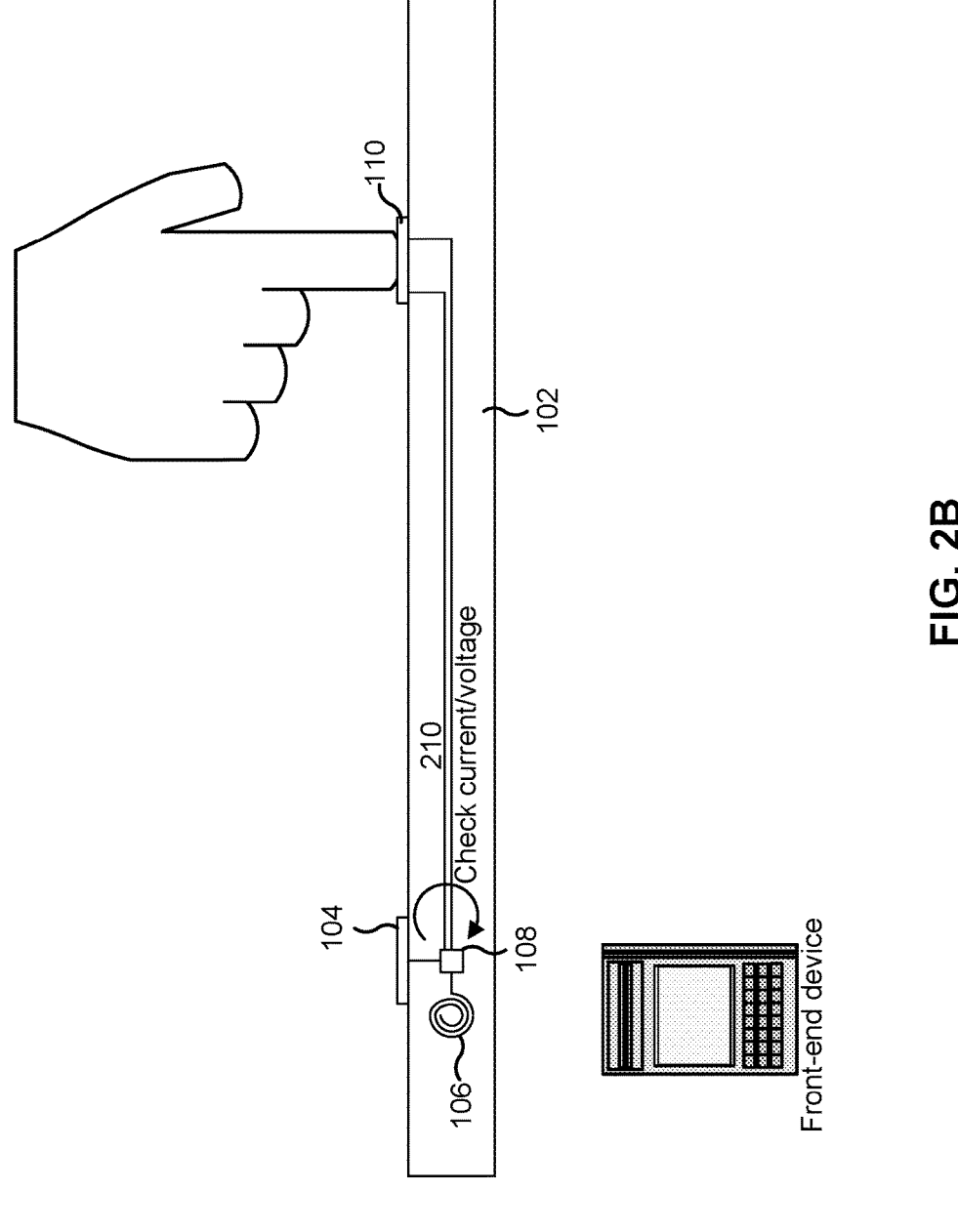
Figure 2C:
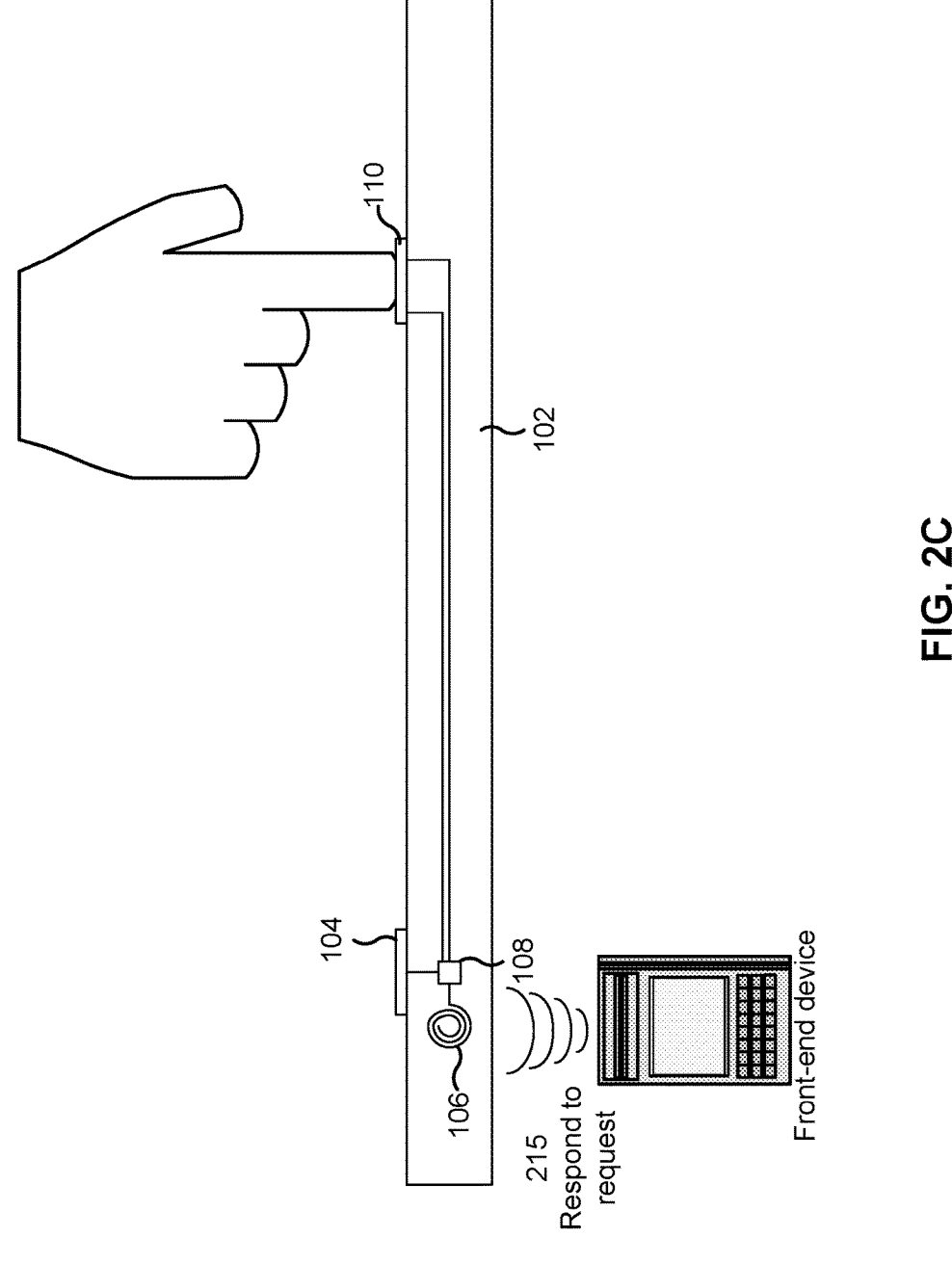

FIGS. 2A-2C are diagrams of an example 200 associated with a finger-activated contactless card. As shown in FIGS. 2A-2C, example 200 includes a card and a front-end device. These devices are described in more detail in connection with FIGS. 5 and 6.

As shown in FIG. 2A, the card may include a substrate 102. The substrate 102 may be as described in connection with FIG. 1A.

The card may further include a communication device. In some implementations, as further shown in FIG. 2A, the communication device may include contact pad 104. For example, the contact pad 104 may be as described in connection with FIG. 1A.

Additionally, or alternatively, and as shown in FIG. 2A, the communication device may include an antenna 106. For example, the antenna 106 may be as described in connection with FIG. 1A.

As further shown in FIG. 2A, the card may include circuitry 108. The circuitry 108 may include an IC, such as an ASIC, configured to process an incoming signal from the communication device (e.g., the contact pad 104 and/or the antenna 106) and to transmit an outgoing signal to the communication device. For example, as shown by reference number 205, the front-end device may transmit, and the communication device may receive, an incoming signal indicating a request for information. In some implementations, the antenna 106 may receive a radio frequency (RF) signal or another electromagnetic signal, based on a request for information from the front-end device, such that the incoming signal is an electrical signal generated based on the RF signal. Accordingly, the electrical signal may be a digital signal or an analog signal generated by the antenna 106. In some implementations (e.g., consistent with ISO/IEC 14443-4), the RF signal may include a plurality of signals based on a plurality of commands from the front-end device (e.g., such that the front-end device and the communication device exchange a plurality of command-response pairs).

As further shown in FIG. 2A, the card may include a contact 110 (e.g., at least one contact). The contact 110 may complete an electrical connection when a finger (or other digit) of the user applies pressure to the contact 110. Accordingly, as shown in FIG. 2B, the circuitry 108 may verify that the contact 110 has been connected to the circuitry 108. In some implementations, as shown by reference number 210, the circuitry 108 may measure a voltage and/or a current associated with the contact 110. Accordingly, the circuitry 108 may determine that a non-zero current and/or a non-open-circuit voltage differential is present across the contact 110.

In one example, the contact 110 may be positioned between the contact pad 104 and the circuitry 108 such that the circuitry 108 does not receive the incoming signal from the contact pad 104 unless the contact 110 is activated. As a result, no additional complexity is added to the circuitry 108. As an alternative, the contact 110 may be included parallel to a closed circuit including the contact pad 104 and the circuitry 108. Accordingly, the circuitry 108 may include a voltage detector and/or a current detector connected to the parallel circuit including the contact 110. As a result, the incoming signal is not distorted by electrical resistance or impedance added by the contact 110 (and, in some implementations, by the human digit).

In one example, as described in connection with FIG. 4A, the contact 110 may be two conductive portions configured to be connected by a human digit. In another example, the contact 110 may be hidden within the substrate 102. For example, as described in connection with FIG. 4B, the contact 110 may be a pressure-activated switch that is hidden underneath a top surface of the substrate 102 and/or level with the top surface of the substrate 102 such that the contact 110 does not protrude or otherwise appear readily distinguishable, visually, from the top surface.

In some implementations, and as described in connection with FIGS. 3A-3B, the card may include a plurality of contacts on the substrate 102. Accordingly, the contact 110 may be a correct contact, of the plurality of contacts. Accordingly, the circuitry 108 may verify that the correct contact 110 is connected to the circuitry 108, as described in connection with FIG. 1B.

In some implementations, the correct contact 110 may be preconfigured, as described in connection with FIG. 1B. As an alternative, different contacts, of the plurality of contacts, may be selected as the correct contact. For example, the circuitry 108 may be reconfigurable, as described in connection with FIG. 1B.

In some implementations, two contacts (e.g., two or more contacts), of the plurality of contacts, are connected to the circuitry 108. Accordingly, the circuitry 108 may be configured to activate based on a combination of the two contacts being connected. For example, the two contacts may be positioned in series between the antenna 106 and the circuitry 108 such that the circuitry 108 does not receive the incoming signal from the antenna 106 unless the two contacts are activated. As a result, no additional complexity is added to the circuitry 108. As an alternative, the two contacts may be included parallel (e.g., in series on a single parallel circuit or on separate parallel circuits) to a closed circuit including the contact pad 104 and the circuitry 108. Accordingly, the circuitry 108 may include a voltage detector and/or a current detector connected to the parallel circuit (e.g., the single parallel circuit including the two contacts or the multiple parallel circuits including the two contacts). As a result, the incoming signal is not distorted by electrical resistance or impedance added by the two contacts (and, in some implementations, by the human digits activating the two contacts).

In some implementations, similarly as described above, the correct contact combination may be preconfigured. Alternatively, and similarly as described above, different contact combinations, of the plurality of contacts, may be selected as the correct contact combination.

In some implementations, the circuitry 108 may be configured to activate based on a sequence of two contacts (e.g., two or more contacts), of the plurality of contacts, being connected. For example, the circuitry 108 may include a voltage detector and/or a current detector configured to measure a voltage and/or a current, respectively, across different contacts according to a temporal pattern, as described in connection with FIG. 1B.

In some implementations, a duration of each interval, for the sequence, may be preconfigured, as described in connection with FIG. 1B. As an alternative, different durations may be selected. For example, the circuitry 108 may be reconfigurable, as described in connection with FIG. 1B.

In some implementations, similarly as described above, the correct contact sequence may be preconfigured. Alternatively, and similarly as described above, different contact sequences may be selected as the correct contact sequence.

In any of the implementations described above, the circuitry 108 may verify that the contact 110 (e.g., the correct contact, the correct contact combination, or the correct contact sequence) has been activated based on the voltage and/or the current satisfying a threshold (e.g., a voltage threshold and/or a current threshold, respectively). For example, the threshold may be preconfigured based on conductive properties associated with a human digit (e.g., the current threshold may be in a range from approximately one microampere to approximately one nanoampere and/or the voltage threshold may be no more than five volts). Alternatively, the threshold may be preconfigured based on conductive properties associated with a switch (e.g., the current threshold may be in a range from approximately one ampere to approximately four amperes and/or the voltage threshold may be no more than five volts).

In some implementations, as described above, the threshold may be preconfigured. Alternatively, and similarly as described above, different thresholds may be selected as the current threshold and/or the voltage threshold.

Based on verifying that the contact 110 has been connected to the circuitry 108, the circuitry 108 may transmit, and the front-end device may receive, an outgoing signal responding to the request for information, as shown in FIG. 2C and by reference number 215. In some implementations, the antenna 106 may transmit an RF signal or another electromagnetic signal, based on a response, to the request, from the circuitry 108, such that the outgoing signal is an RF signal based on an electrical signal. Accordingly, the electrical signal may be a digital signal or an analog signal that the antenna 106 converts into a wireless signal. In some implementations (e.g., consistent with ISO/IEC 14443-4), the RF signal may include a plurality of signals based on a plurality of responses from the circuitry 108 (e.g., such that the front-end device and the communication device exchange a plurality of command-response pairs).

By using techniques as described in connection with FIGS. 2A-2C, the card communicates with the front-end device when the contact 110, embedded on the substrate 102 of the physical card, is active. As a result, security is improved because the card cannot be used without activating the contact 110 (e.g., using a finger or another digit), which may be hidden or otherwise visually inconspicuous.

In some implementations, examples 100 and 200 may be combined. For example, the circuitry 108 may be configured to activate based on receiving an incoming signal from the contact pad 104 and verifying that a first contact, of the plurality of contacts, is connected or to activate based on receiving an incoming signal from the antenna 106 and verifying that a second contact, of the plurality of contacts, is connected. As a result, one contact may allow the card to be used for contactless interactions with the front-end device while a different contact allows the card to be used for contact-based interactions with the front-end device. Although described using one correct contact for contactless interactions and another correct contact for contact-based interactions, other implementations may include using one correct contact combination and/or one correct contact sequence for contactless interactions and/or using another correct contact combination and/or another correct contact sequence for contact-based interactions.

As indicated above, FIGS. 2A-2C are provided as an example. Other examples may differ from what is described with regard to FIGS. 2A-2C.

Figure 3A:
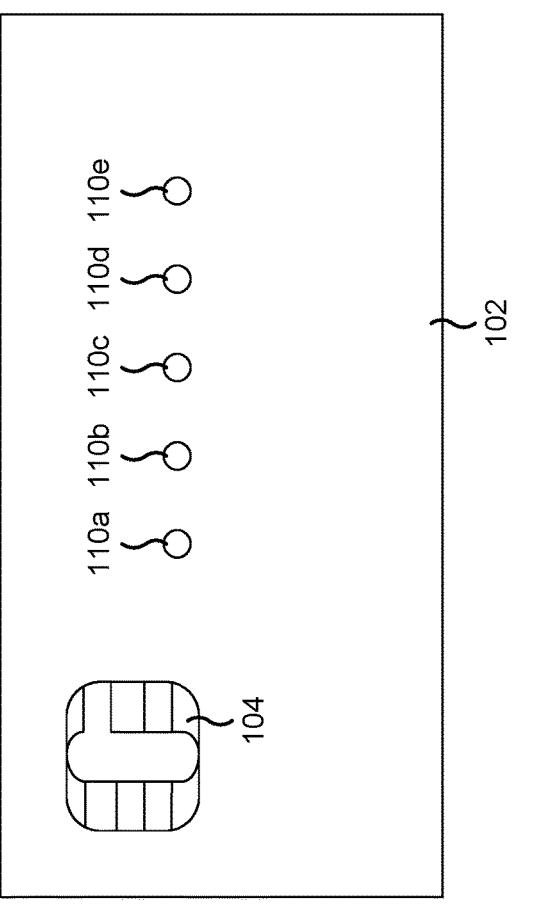
FIGS. 3A-3B are diagrams of an example implementation relating to multiple contacts on a finger-activated card.
Figure 3B:
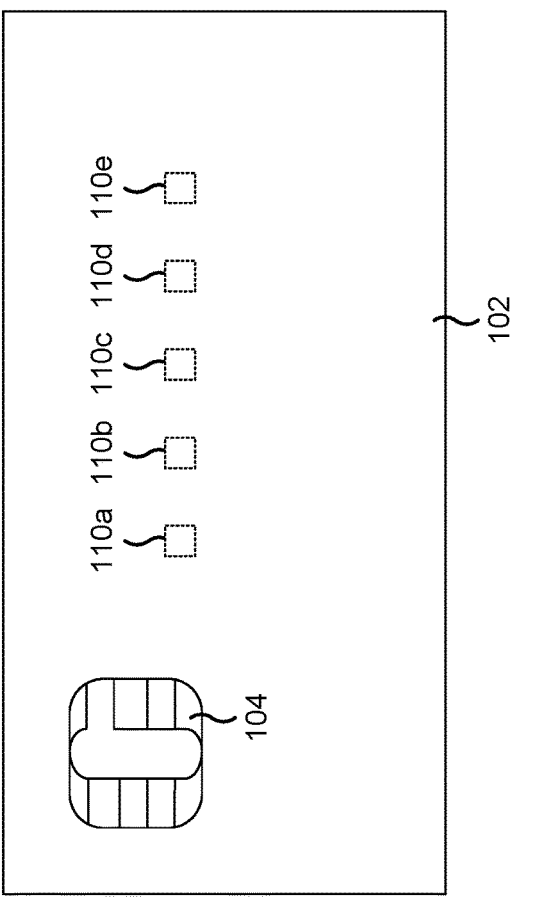

FIGS. 3A and 3B are diagrams of examples 300 and 350, respectively, associated with multiple contacts on a finger-activated card. As shown in FIGS. 3A and 3B, examples 300 and 350 each include a substrate 102 with a contact pad 104. Circuitry and an antenna, as described in connection with FIGS. 1A-1C and FIGS. 2A-2C, may be embedded in the substrate 102.

As further shown in FIG. 3A, the substrate 102 may include contacts 110a, 110b, 110c, 110d, and 110e. Although depicted with five contacts, other implementations may include fewer contacts (e.g., four contacts, three contacts, two contacts, or one contact) or additional contacts (e.g., six contacts, seven contacts, and so on).

As shown in FIG. 3A, each contact 110a, 110b, 110c, 110d, and 110e includes a circular recess into which a human digit may be inserted. Although depicted as circular, the contacts may be ellipses, square, rectangular, and/or another type of regular or irregular shape. Additionally, although depicted as the same shape, two or more of the contacts may be different shapes.

As shown in FIG. 3B, the substrate 102 may include contacts 110a, 110b, 110c, 110d, and 110e. Although depicted with five contacts, other implementations may include fewer contacts (e.g., four contacts, three contacts, two contacts, or one contact) or additional contacts (e.g., six contacts, seven contacts, and so on).

As further shown in FIG. 3B, each contact 110a, 110b, 110c, 110d, and 110e includes a switch, within the substrate 102, that is activated by pressure. In example 350, the switches are underneath a top surface of the substrate 102 because the switches are fully embedded within the substrate 102. Alternatively, each switch may include a moveable portion of the top surface of the substrate 102 such that depressing the moveable portion of the top surface activates the switch.

As indicated above, FIGS. 3A-3B are provided as examples. Other examples may differ from what is described with regard to FIGS. 3A-3B.

Figure 4A:
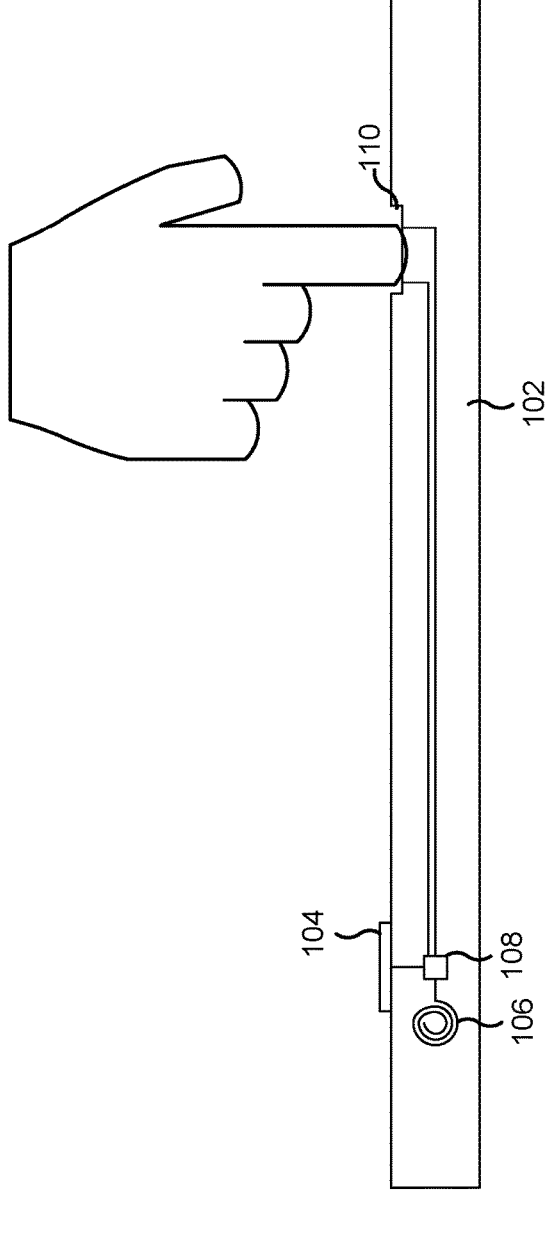
FIGS. 4A-4B are diagrams of an example implementation relating to contact types on a finger-activated card.
Figure 4B:
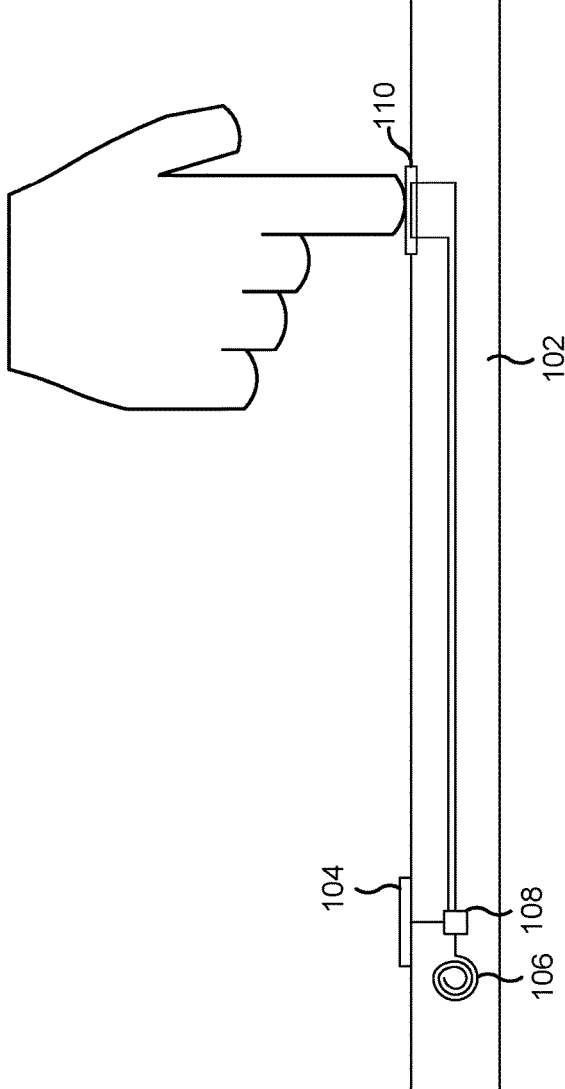

FIGS. 4A and 4B are diagrams of examples 400 and 450, respectively, associated with contact types on a finger-activated card. As shown in FIGS. 4A and 4B, examples 400 and 450 each include a substrate 102 with a contact pad 104. Further, examples 400 and 450 each include an antenna 106 and circuitry 108, as described in connection with FIGS. 1A-1C and FIGS. 2A-2C.

As shown in FIG. 4A, the contact 110 is a recess into which a human digit may be inserted. Accordingly, the recess includes one contact within the recess that is physically separated from another contact within the recess. Accordingly, the contacts are electrically connected when the human digit is inserted into the recess. Although the contacts are shown on a bottom surface of the recess, one contact (or both contacts) may be on a sidewall (or opposite sidewalls) of the recess.

As shown in FIG. 4B, the contact 110 is a switch that is activated by pressure. Accordingly, the recess includes one contact within the recess that is physically separated from another contact within the recess. For example, the switch may be a piezo switch, a capacitive switch, and/or another type of switch activated by pressure. Although the contact 110 is shown as protruding above a top surface of the substrate 102, the contact 110 may instead include a moveable portion of the top surface (e.g., as described in connection with FIG. 3B) or may be fully embedded underneath the top surface (e.g., as described in connection with FIG. 3A).

As indicated above, FIGS. 4A-4B are provided as examples. Other examples may differ from what is described with regard to FIGS. 4A-4B.

Figure 5:
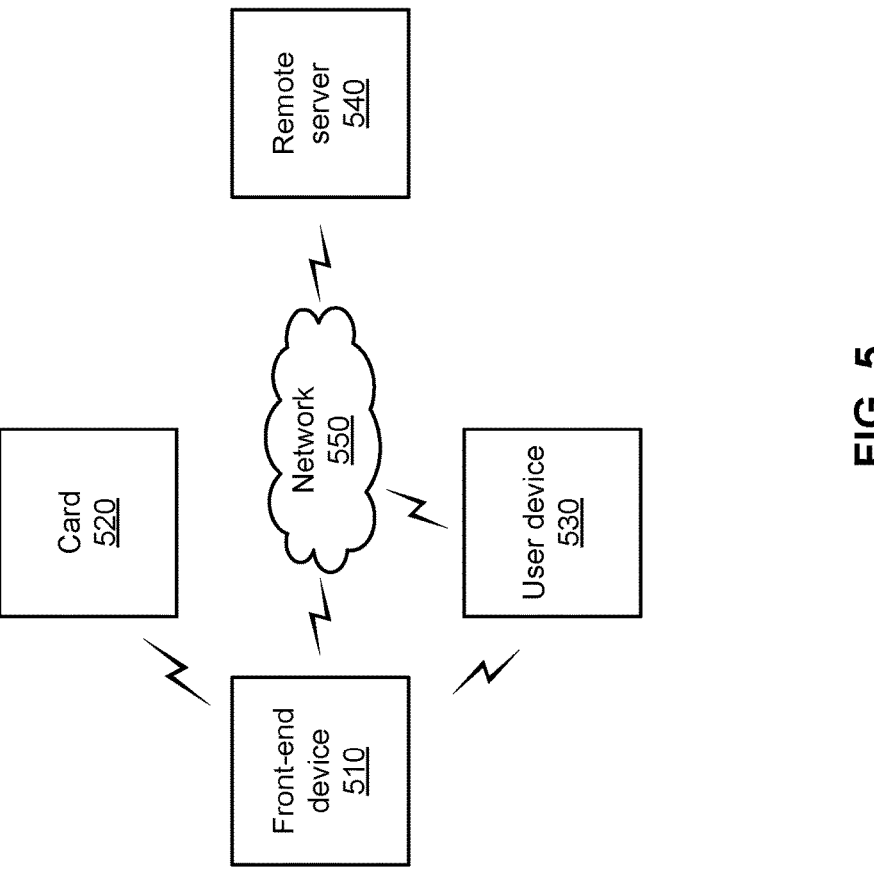
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a front-end device 510, a card 520, a user device 530, a remote server 540, and/or a network 550. Devices of environment 500 may interconnect via wired connections and/or wireless connections.

The front-end device 510 includes one or more devices capable of facilitating an electronic transaction associated with the card 520. For example, the front-end device 510 may include a PoS terminal, a payment terminal (e.g., a credit card terminal, a contactless payment terminal, a mobile credit card reader, or a chip reader), and/or an ATM. In some implementations, the front-end device 510 includes an access control terminal (e.g., used to control physical access to a secure area), such as an access control panel used to control an access-controlled entry (e.g., a turnstile, a door, a gate, or another physical barrier). The front-end device 510 may include one or more input components and/or one or more output components to facilitate obtaining data (e.g., account information) from the card 520 and/or to facilitate interaction with and/or authorization from an owner or accountholder of the card 520. Example input components of the front-end device 510 include a number keypad, a touchscreen, a magnetic stripe reader, a chip reader, and/or an RF signal reader (e.g., a near-field communication (NFC) reader). Example output devices of front-end device 510 include a display and/or a speaker.

The card 520 includes one or more devices capable of being used for an electronic transaction. In some implementations, the card 520 includes a transaction card (or another physical medium with integrated circuitry) capable of storing and communicating account information, such as a credit card, a debit card, a gift card, an ATM card, a transit card, a fare card, and/or an access card.

The card 520 may store account information associated with the card 520, which may be used in connection with an electronic transaction facilitated by the front-end device 510. The account information may include, for example, an account identifier that identifies an account (e.g., a bank account or a credit account) associated with the card 520 (e.g., an account number, a card number, a bank routing number, and/or a bank identifier), a cardholder identifier (e.g., identifying a name of a person, business, or entity associated with the account or the card 520), expiration information (e.g., identifying an expiration month and/or an expiration year associated with the card 520), and/or a credential (e.g., a payment token). In some implementations, the card 520 may store the account information in tamper-resistant memory of the card 520, such as in a secure element. As part of performing an electronic transaction, the card 520 may transmit the account information to the front-end device 510 using a communication component, such as a magnetic stripe, an IC chip (e.g., a EUROPAY®, MASTERCARD®, VISA® (EMV) chip), and/or a contactless communication component (e.g., an NFC component, an RF component, a Bluetooth® component, and/or a Bluetooth® Low Energy (BLE) component). Thus, the card 520 and the front-end device 510 may communicate with one another by coming into contact with one another (e.g., using a magnetic stripe or an EMV chip) or via contactless communication (e.g., using NFC).

The user device 530 includes one or more devices capable of being used for an electronic transaction, as described above in connection with the card 520. The user device 530 may include a communication device and/or a computing device. For example, the user device 530 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 530 may be capable of receiving, generating, storing, processing, and/or providing information associated with indicating a correct contact or a correct sequence of contacts in order to activate the card 520, as described elsewhere herein.

The remote server 540 includes one or more devices capable of processing, authorizing, and/or facilitating a transaction. For example, the remote server 540 may include one or more servers and/or computing hardware (e.g., in a cloud computing environment or separate from a cloud computing environment) configured to receive and/or store information associated with processing an electronic transaction. The remote server 540 may process a transaction, such as to approve (e.g., permit, authorize, or the like) or decline (e.g., reject, deny, or the like) the transaction and/or to complete the transaction if the transaction is approved. The remote server 540 may process the transaction based on information received from the front-end device 510, such as transaction data (e.g., information that identifies a transaction amount, a merchant, a time of a transaction, a location of the transaction, or the like), account information communicated to the front-end device 510 by the card 520, and/or information stored by the remote server 540 (e.g., for fraud detection).

The remote server 540 may be associated with a financial institution (e.g., a bank, a lender, a credit card company, or a credit union) and/or may be associated with a transaction card association that authorizes a transaction and/or facilitates a transfer of funds. For example, the remote server 540 may be associated with an issuing bank associated with the card 520, an acquiring bank (or merchant bank) associated with the merchant and/or the front-end device 510, and/or a transaction card association (e.g., VISA® or MASTER-CARD®) associated with the card 520. Based on receiving information associated with the card 520 from the front-end device 510, one or more devices of the remote server 540 may communicate to authorize a transaction and/or to transfer funds from an account associated with the card 520 to an account of an entity (e.g., a merchant) associated with the front-end device 510.

The network 550 includes one or more wired and/or wireless networks. For example, the network 550 may include a cellular network, a public land mobile network, a local area network, a wide area network, a metropolitan area network, a telephone network, a private network, the Internet, and/or a combination of these or other types of networks. The network 550 enables communication among the devices of environment 500. In some implementations, the front-end device 510 may communicate with the card 520 using a first network (e.g., a contactless network or by coming into contact with the card 520) and may communicate with the remote server 540 using a second network.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
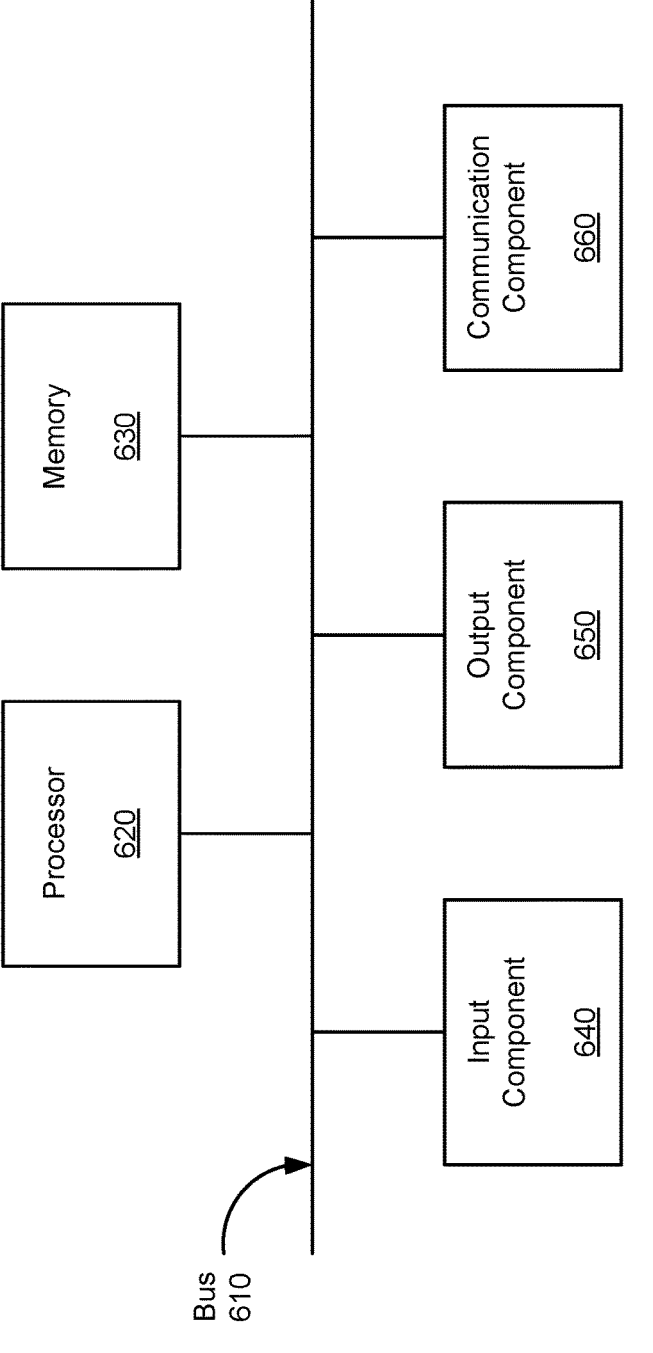
FIG. 6 is a diagram of example components of one or more devices of FIG. 5.

FIG. 6 is a diagram of example components of a device 600, which may correspond to a front-end device, a user device, and/or a remote server. In some implementations, a front-end device, a user device, and/or a remote server may include one or more devices 600 and/or one or more components of device 600. As shown in FIG. 6, device 600 may include a bus 610, a processor 620, a memory 630, an input component 640, an output component 650, and a communication component 660.

Bus 610 includes one or more components that enable wired and/or wireless communication among the components of device 600. Bus 610 may couple together two or more components of FIG. 6, such as via operative coupling, communicative coupling, electronic coupling, and/or electric coupling. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform one or more operations or processes described elsewhere herein.

Memory 630 includes volatile and/or nonvolatile memory. For example, memory 630 may include random access memory (RAM), ROM, a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 includes one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry is used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flowchart of an example process 700 associated with using a finger-activated chip or contactless card. In some implementations, one or more process blocks of FIG. 7 may be performed by a circuit (e.g., an ASIC or other circuit included in a card 520). In some implementations, one or more process blocks of FIG. 7 may be performed by another device or a group of devices separate from or including the device, such as front-end device 510, user device 530, and/or remote server 540. Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, from a front-end device and at a communication device embedded in a substrate, an incoming signal indicating a request for information (block 710). As further shown in FIG. 7, process 700 may include verifying that at least one correct contact, of a plurality of contacts on the substrate, has been connected to circuitry embedded in the substrate (block 720). As further shown in FIG. 7, process 700 may include transmitting, to the front-end device and using the communication device, an outgoing signal responding to the request for information based on verifying that the at least one correct contact has been connected (block 730).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1C and/or 2A-2C.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A card for communicating with a front-end device, the card comprising:

a substrate;

a communication device at least partially embedded in the substrate and configured to communicate with the front-end device, wherein the communication device includes a contact pad, wherein the contact pad receives electrical signals from the front-end device;

circuitry configured to process an incoming signal from the communication device and to transmit an outgoing signal to the communication device; and a plurality of contacts on the substrate, wherein two or more contacts, of the plurality of contacts, are connected to the circuitry and are configured to activate the circuitry, wherein the two or more contacts are positioned between the contact pad and the circuitry; and a dummy contact on the substrate, wherein the dummy contact does not have an electrical or physical connection to the circuitry.

2. The card of claim 1, further comprising:

an additional communication device configured to communicate wirelessly with the front-end device, wherein at least a first contact and a second contact, of the plurality of contacts, are connected to the circuitry, and wherein the circuitry is configured to activate based on receiving the incoming signal from the communication device and the first contact being connected to the circuitry or receiving the incoming signal from the additional communication device and the second contact being connected to the circuitry.

3. The card of claim 1, wherein each contact, of the plurality of contacts, comprises two conductive portions configured to be connected by a human digit.

4. The card of claim 1, wherein each contact, of the plurality of contacts, comprises a switch that is activated by pressure.

5. The card of claim 1, wherein the communication device comprises a plurality of pins for interfacing with the front-end device.

6. The card of claim 1, wherein the communication device comprises a radio frequency (RF) transceiver for wirelessly communicating with the front-end device.

7. The card of claim 1, wherein the two or more contacts are positioned in series between the contact pad and the circuitry such that the circuitry does not receive an incoming signal from the contact pad unless the two or more contacts are activated.

8. The card of claim 1, wherein the two or more contacts are positioned in series between the contact pad and the circuitry.

9. The card of claim 1, wherein the circuitry further includes a current detector configured to measure a current across two or more contacts, of the plurality of contacts, according to a temporal pattern.

* * * * *